(12) United States Patent
Amano et al.

(10) Patent No.: US 11,338,685 B2
(45) Date of Patent: May 24, 2022

(54) ENGINE CONTROL DEVICE FOR ELECTRIC VEHICLE

(71) Applicant: TOYOTA JIDOSHA KABUSHIKI KAISHA, Toyota (JP)

(72) Inventors: Takashi Amano, Susono (JP); Kohji Ogasawara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 16/987,620

(22) Filed: Aug. 7, 2020

(65) Prior Publication Data

US 2021/0053449 A1  Feb. 25, 2021

(30) Foreign Application Priority Data

Aug. 23, 2019  (JP) .............................. JP2019-153299

(51) Int. Cl.
  *B60L 50/62* (2019.01)
  *B60L 15/20* (2006.01)
  *B60L 50/13* (2019.01)
  *F02D 41/06* (2006.01)

(52) U.S. Cl.
  CPC ........... *B60L 50/62* (2019.02); *B60L 15/2045* (2013.01); *B60L 50/13* (2019.02); *B60L 2240/441* (2013.01); *B60L 2240/443* (2013.01); *B60L 2260/22* (2013.01); *B60L 2270/12* (2013.01); *F02D 41/068* (2013.01); *F02D 2200/101* (2013.01); *F02D 2200/1002* (2013.01); *F02D 2200/501* (2013.01)

(58) Field of Classification Search
  CPC ...... B60L 50/62; B60L 50/13; B60L 15/2045; B60L 2240/441; B60L 2240/443
  USPC ........................................................ 701/101
  See application file for complete search history.

(56) References Cited

U.S. PATENT DOCUMENTS

| 9,751,524 | B2 | 9/2017 | Morisaki et al. | |
|---|---|---|---|---|
| 9,970,364 | B2 | 5/2018 | Yokoyama et al. | |
| 2013/0274977 | A1* | 10/2013 | Fushiki | B60W 10/06 701/22 |
| 2015/0217757 | A1* | 8/2015 | Okamoto | B60W 10/08 701/22 |

(Continued)

FOREIGN PATENT DOCUMENTS

| JP | 2006-322339 A | 11/2006 |
|---|---|---|
| JP | 2015-164831 A | 9/2015 |
| JP | 2017-052388 A | 3/2017 |

(Continued)

*Primary Examiner* — Mahmoud Gimie
(74) *Attorney, Agent, or Firm* — Oliff PLC (57) ABSTRACT

An engine control device for an electric vehicle having an electrical rotating machine, includes: an engine control unit determining an engine rotational speed and an engine torque such that a particulate number of particulate matter per unit gas quantity that the engine releases into an atmosphere becomes equal to or less than a target value having been set in association with a warm-up state of the engine, the engine rotational speed, and the engine torque, and such that the engine rotational speed when a vehicle speed is less than a threshold value is lower than the engine rotational speed when the vehicle speed is equal to or more than the threshold value, and controlling the engine based on the determined engine rotational speed and the engine torque.

3 Claims, 9 Drawing Sheets

(56) References Cited

U.S. PATENT DOCUMENTS

2018/0222469 A1* 8/2018 Iwase .................. B60W 30/182

FOREIGN PATENT DOCUMENTS

| JP | 2017-052500 A | 3/2017 |
| JP | 2017-137773 A | 8/2017 |

* cited by examiner

ENGINE CONTROL DEVICE FOR ELECTRIC VEHICLE

CROSS-REFERENCE TO RELATED APPLICATION(S)

The present application claims priority to and incorporates by reference the entire contents of Japanese Patent Application No. 2019-153299 filed in Japan on Aug. 23, 2019.

BACKGROUND

The present disclosure relates to an engine control device for an electric vehicle.

For an electric vehicle, such as a range extended electric vehicle (REEV), in the related art, when the state of charge (SOC) of a battery lowers during traveling, an engine starts up such that a power generator starts power generation in order to charge the battery. Because the electric vehicle has a low frequency of starting of the engine, the warming up of the engine is not sufficient during traveling. Thus, the engine is cold at the time of starting of the engine, so that the engine is often under an environment in which fuel has difficulty in vaporizing. Thus, under the environment, if the output of the engine increases to the degree that the power generator can generate power, the particulate number (PN) of particulate matter that the engine releases into the atmosphere, is likely to increase.

Japanese Laid-open Patent Publication No. 2017-137773 discloses a technology in which an engine control device performs control of moving, at the time of cold operation of the engine, the operating point of the engine to a higher rotational speed and a lower torque, corresponding to the same request power, than those on a fuel-consumption line emphasizing fuel consumption, to reduce the particulate number of particulate matter.

SUMMARY

There is a need for providing an engine control device for an electric vehicle, enabling both reduction of the particulate number of particulate matter and lower NV.

According to an embodiment, an engine control device for an electric vehicle including: an electrical rotating machine generating a driving force for driving a wheel; a power storage device storing a power to be supplied to the electrical rotating machine; a power generator generating a power to charge the power storage device; and an engine generating e a driving force for driving the power generator, includes: an engine control unit determining an engine rotational speed and an engine torque such that a particulate number of particulate matter per unit gas quantity that the engine releases into an atmosphere becomes equal to or less than a target value having been set in association with a warm-up state of the engine, the engine rotational speed, and the engine torque, and such that the engine rotational speed when a vehicle speed is less than a threshold value is lower than the engine rotational speed when the vehicle speed is equal to or more than the threshold value, and controlling the engine based on the determined engine rotational speed and the engine torque.

BRIEF DESCRIPTION OF THE DRAWINGS

Part (a) of FIG. 4 illustrates exemplary equi-PN lines at a water temperature of T2° C..

Part (b) of FIG. 4 illustrates exemplary equi-PN lines at a water temperature of T4° C..

DETAILED DESCRIPTION

In the related art, for the technology disclosed in Japanese Laid-open Patent Publication No. 2017-137773, a higher engine rotational speed for reduction of the particulate number of particulate matter results in deterioration in noise vibration (NV). Thus, there is a demand for a technology of achieving both reduction of the particulate number of particulate matter and lower NV.

An embodiment of an engine control device for an electric vehicle according to the present disclosure will be described below. Note that the present disclosure is not limited to the present embodiment. An example of the electric vehicle to be applied with the engine control device of the present disclosure is a REEV including an engine for power generation and a motor generator for traveling, the REEV being to travel with only driving force from the motor generator.

Figure 1:
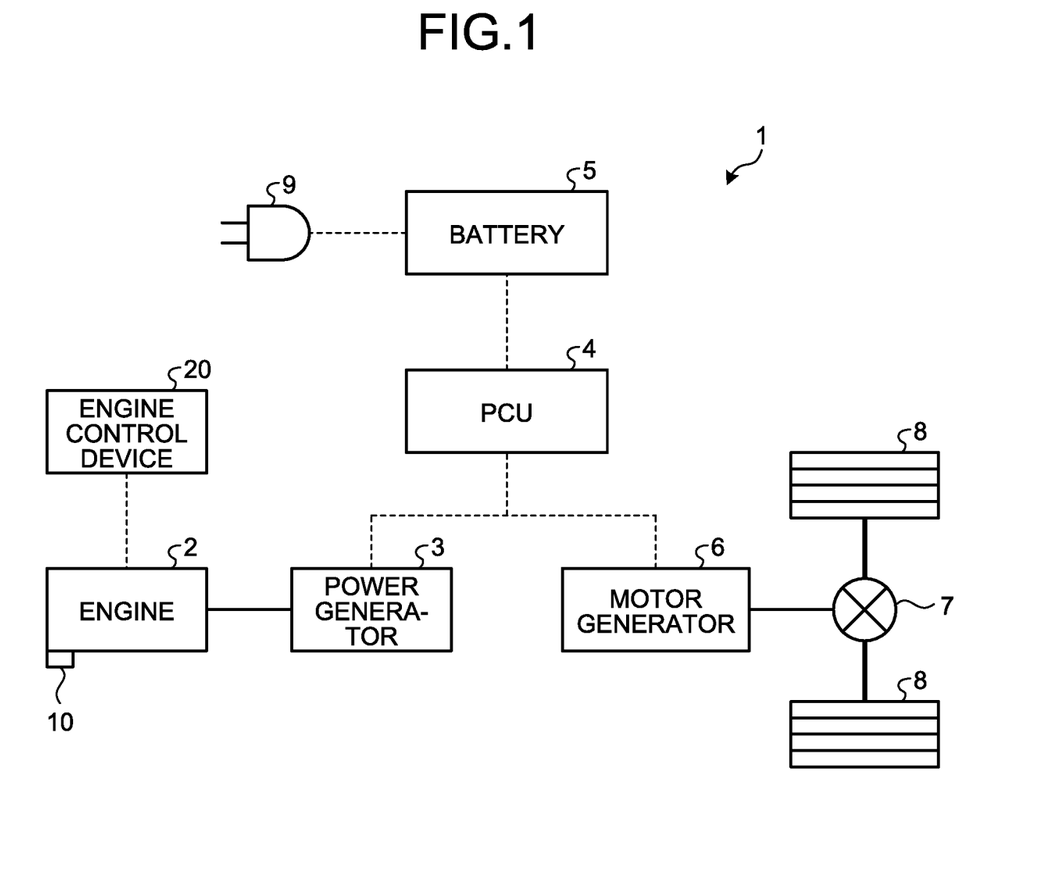
FIG. 1 is a block diagram of a configuration of an electric vehicle to be applied with an engine control device for the electric vehicle according to an embodiment.

FIG. 1 is a block diagram of a configuration of an electric vehicle 1 to be applied with an engine control device 20 for the electric vehicle 1 according to the embodiment. The electric vehicle 1 includes, for example, an engine 2, a power generator 3, a power control unit (PCU) 4, a battery 5, a motor generator 6, a differential device 7, driving wheels 8, a water-temperature sensor 10, and the engine control device 20.

The engine 2 that is an internal combustion engine, such as a gasoline engine or a diesel engine, outputs a driving force of driving the power generator 3.

The power generator 3 generates power, due to the driving force output from the engine 2. The power generated by the power generator 3 is supplied to the battery 5 through the PCU 4 or to the motor generator 6.

The PCU 4 has a function of converting direct-current power supplied from the battery 5 into alternating-current power and supplying the alternating-current power to the motor generator 6 and a function of converting alternating-current power generated by the power generator 3 or the motor generator 6 into direct-current power and supplying the direct-current power to the battery 5.

The battery 5 is a power storage device including a secondary battery, such as a nickel hydrogen battery or a lithium-ion battery. The battery 5 is charged by power generated by the power generator 3 or the motor generator 6, and additionally can be charged by power supplied from an external power source through a plug 9. Note that the battery 5 is not limited to the secondary battery but is required at least to be a power storage device that is capable of generating direct current voltage and is rechargeable. Thus, the battery 5 may be, for example, a capacitor.

The motor generator 6 is, for example, a three-phase alternating-current electrical rotating machine. With power supplied from the power generator 3 or from the battery 5 through the PCU 4, the motor generator 6 outputs a driving force of driving the driving wheels 8 through the differential device 7. The motor generator 6 also functions as a power generator that generates power at the time of braking of the electric vehicle 1. The power generated by the motor generator 6 is supplied to the battery 5 through the PCU 4.

The water-temperature sensor 10 is a water-temperature detection unit that detects the temperature of cooling water that is a coolant of cooling the engine 2 (hereinafter, referred to as the water temperature of the engine 2).

The engine control device 20 includes, for example, a central processing unit (CPU), a random access memory (RAM), and a read only memory (ROM). The ROM stores, for example, a plurality of maps for power generation each indicating the relationship between engine rotational speed and engine torque for the target value of the PN per unit gas quantity, previously created every warm-up state of the engine 2. Note that the unit gas quantity is a certain exhaust gas quantity exhausted from the engine 2 into the atmosphere. The engine control device 20 determines the engine rotational speed and the engine torque of the engine 2, for example, on the basis of water-temperature information from the water-temperature sensor 10, vehicle-speed information from a vehicle-speed sensor (not illustrated), and the maps for power generation stored in the ROM, to control the engine 2.

The electric vehicle 1 according to the embodiment has a plurality of traveling modes including a charge depleting (CD) mode in which the power of the battery 5 is consumed and a charge sustaining (CS) mode in which the engine 2 operates such that the power generator 3 generates power in order to retain the power storage quantity of the battery 5. The frequency of opportunity of operating the engine 2 in the electric vehicle 1 is lower when the traveling mode is the CD mode than when the traveling mode is the CS mode, so that lower fuel consumption and lower NV can be achieved.

Figure 2:
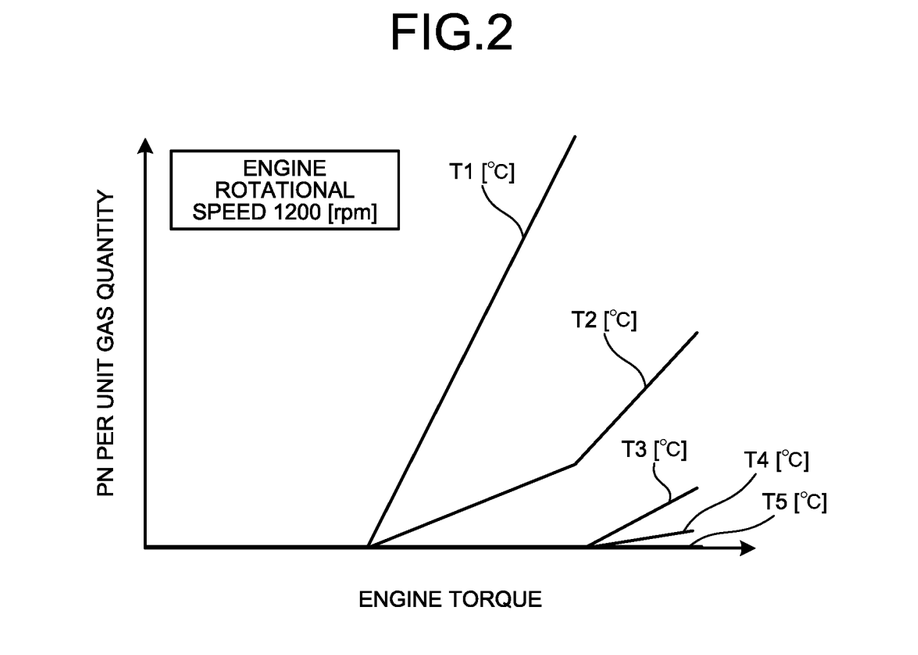
FIG. 2 is a graph of a relationship between engine torque, PN per unit gas quantity, and water temperature of an engine at an engine rotational speed of 1200 rpm.
Figure 3:
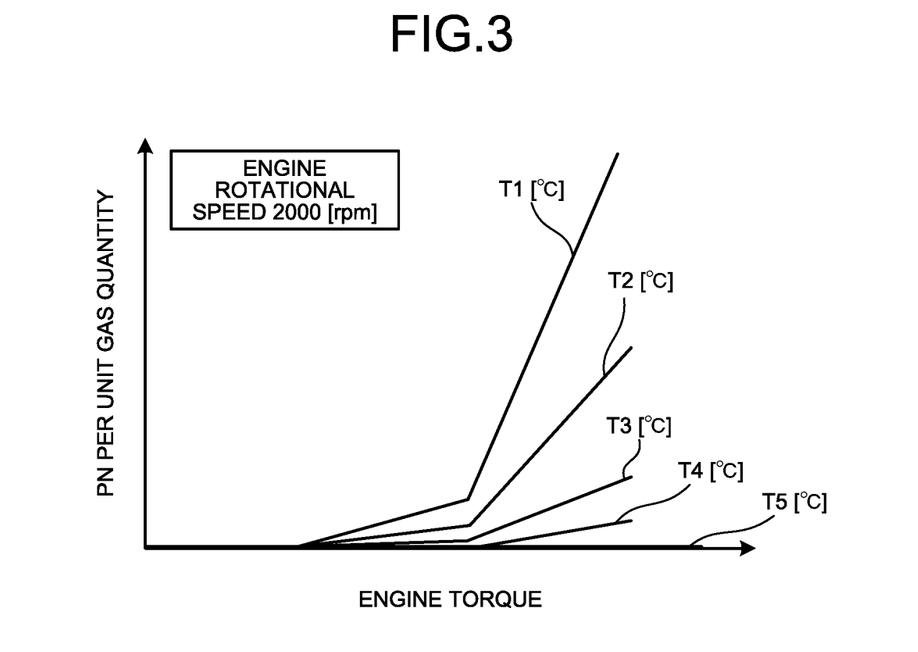
FIG. 3 is a graph of a relationship between the engine torque, the PN per unit gas quantity, the water temperature of the engine at an engine rotational speed of 2000 rpm.

FIG. 2 is a graph of the relationship between the engine torque, the PN per unit gas quantity, and the water temperature of the engine 2 at an engine rotational speed of 1200 rpm. FIG. 3 is a graph of the relationship between the engine torque, the PN per unit gas quantity, and the water temperature of the engine 2 at an engine rotational speed of 2000 rpm. Note that, in FIGS. 2 and 3, T1° C., T2° C., T3° C., T4° C., and T5° C. for the temperature of the cooling water of cooling the engine 2 (hereinafter, referred to as the water temperature of the engine 2) satisfy the following relationship: T1° C.<T2° C.<T3° C.<T4° C.<T5° C.

As can be seen from FIGS. 2 and 3, both at an engine rotational speed of 1200 rpm and at an engine rotational speed of 2000 rpm, a higher water temperature of the engine 2 and a higher engine torque tend to reduce the PN per unit gas quantity. In particular, it can be seen that the PN per unit gas quantity is considerably small with the water temperature of the engine 2 at T5° C. regardless of the engine rotational speed and the engine torque.

Thus, in a case where the electric vehicle 1 according to the embodiment is in the CS mode, until the warm-up state of the engine 2 satisfies a predetermined state, in other words, until the water temperature of the engine 2 reaches a target water temperature to be described later, the engine control device 20 controls the engine rotational speed and the engine torque such that the PN per unit gas quantity remains at a target value or less. That is, in a case where the power generator 3 generates power in the CS mode, the engine control device 20 selects a map for power generation stored in the ROM in accordance with the warm-up state of the engine 2, and controls the engine rotational speed and the engine torque. In this case, use of the map for power generation enables easy determination of the engine rotational speed and the engine torque corresponding to the warm-up state of the engine 2 from the map for power generation.

In the electric vehicle 1 according to the embodiment, the engine control device 20 determines the warm-up state of the engine 2, on the basis of the water temperature of the engine 2 from a detection result of the water-temperature sensor 10. This arrangement enables easy determination of the warm-up state of the engine 2. Note that the warm-up state of the engine 2 may be determined, for example, with the temperature of engine oil, engine integrated air quantity, engine total operation hours, or the vehicle travel distance in engine operation. As the target water temperature of the engine 2 described above, the water temperature of the engine 2 at which warming up of the engine 2 is completed may be acquired by experiment in advance. For example, the target water temperature is preferably approximately 50° C. to 70° C., more preferably, 60° C.

Figure 4:
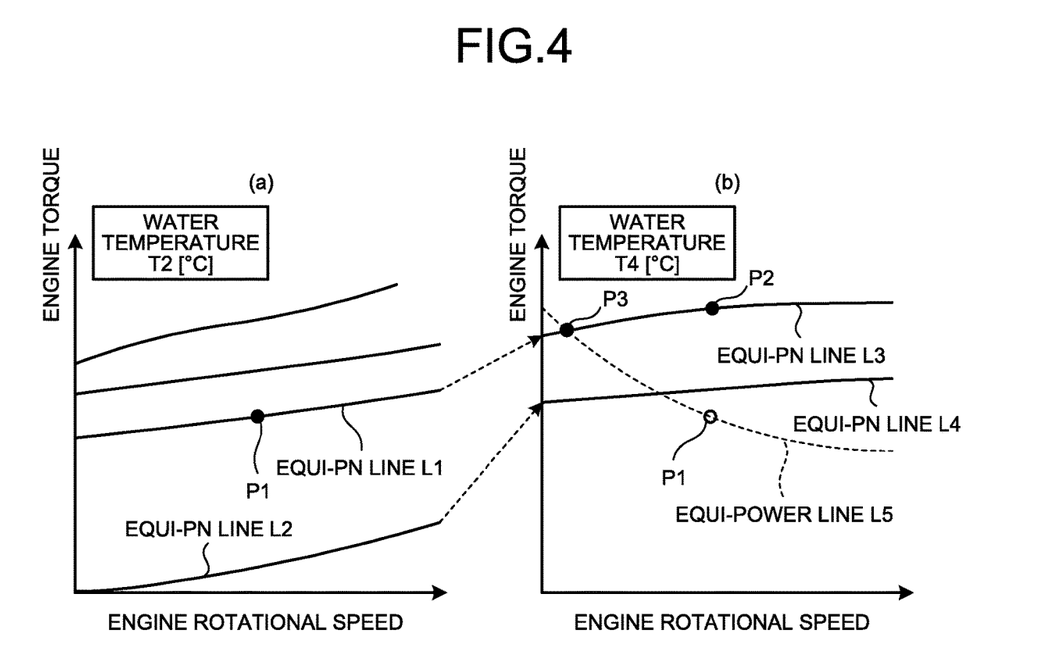

Part (a) of FIG. 4 illustrates exemplary equi-PN lines at a water temperature of T2° C. Part (b) of FIG. 4 illustrates exemplary equi-PN lines at a water temperature of T4° C.

The equi-PN line L1 at a water temperature of T2° C. illustrated in part (a) of FIG. 4 and the equi-PN line L3 at a water temperature of T4° C. illustrated in part (b) of FIG. 4 are identical in PN per unit gas quantity. In addition, the equi-PN line L2 at a water temperature of T2° C. illustrated in part (a) of FIG. 4 and the equi-PN line L4 at a water temperature of T4° C. illustrated in part (b) of FIG. 4 are identical in PN per unit gas quantity. As can be seen from part (a) and part (b) of FIG. 4, a higher water temperature of the engine 2 causes transition to higher engine torque between the equi-PN lines identical in PN per unit gas quantity.

Here, an exemplary case where the engine 2 operates such that engine output remains constant and the PN per unit gas quantity remains constant between at a water temperature of T2° C. and at a water temperature of T4° C., will be described. Note that, in part (a) and part (b) of FIG. 4, a target equi-PN line on which the PN per unit gas quantity has the target value is defined as the equi-PN line L1 at a water temperature of T2° C. and the equi-PN line L3 at a water temperature of T4° C. Note that the target equi-PN line requires to be determined on the basis of a result of test traveling performed in advance under a plurality of traveling conditions including, for example, a WLTC mode such that the integrated PN remains at a set value or less until the water temperature of the engine 2 reaches the target water temperature at which warming up of the engine 2 is completed.

On the equi-PN line L3 at a water temperature of T4° C., the operating point of the engine 2 identical in engine rotational speed to the operating point P1 on the equi-PN line L1 at a water temperature of T2° C. is the operating point P2 illustrated in part (b) of FIG. 4. The equi-power line L5 equivalent in engine output to the operating point P1 of the engine 2 on the equi-PN line L1 at a water temperature of T2° C., crosses the equi-PN line L3 at a water temperature of T4° C. at an engine rotational speed lower than that at the operating point P2.

In a case where the engine output and the PN per unit gas quantity are kept constant between at a water temperature of T2° C. and at a water temperature of T4° C., the operating point of the engine 2 is moved on the equi-power line L5 from the operating point P1 to the operating point P3 at which the equi-power line L5 and the equi-PN line L3 cross each other. This arrangement enables the engine 2 to operate such that the engine output and the PN per unit gas quantity remain constant between at a water temperature of T2° C. and at a water temperature of T4° C. In this case, movement of the operating point of the engine 2 from the operating point P1 to the operating point P3 causes a higher engine torque and a lower engine rotational speed at a water temperature of T4° C. than those at a water temperature of T2° C. Thus, lower NV can be achieved by the decrease of the engine rotational speed at a water temperature of T4° C. to a water temperature of T2° C.

Note that, in a case where the PN per unit gas quantity is reduced below that of the equi-PN line L3 at a water temperature of T4° C., the operating point at an engine torque lower than that of the equi-PN line L3 requires selecting. For example, in a case where the engine output is made identical to that at the operating point P1 at a water temperature of T2° C. and the PN per unit gas quantity is reduced below that at the operating point P1 at a water temperature of T2° C., the operating point at an engine torque lower than that at the operating point P3 on the equi-power line L5, for example, the operating point at which the equi-power line L5 and the equi-PN line L4 cross each other requires selecting.

Figure 5:
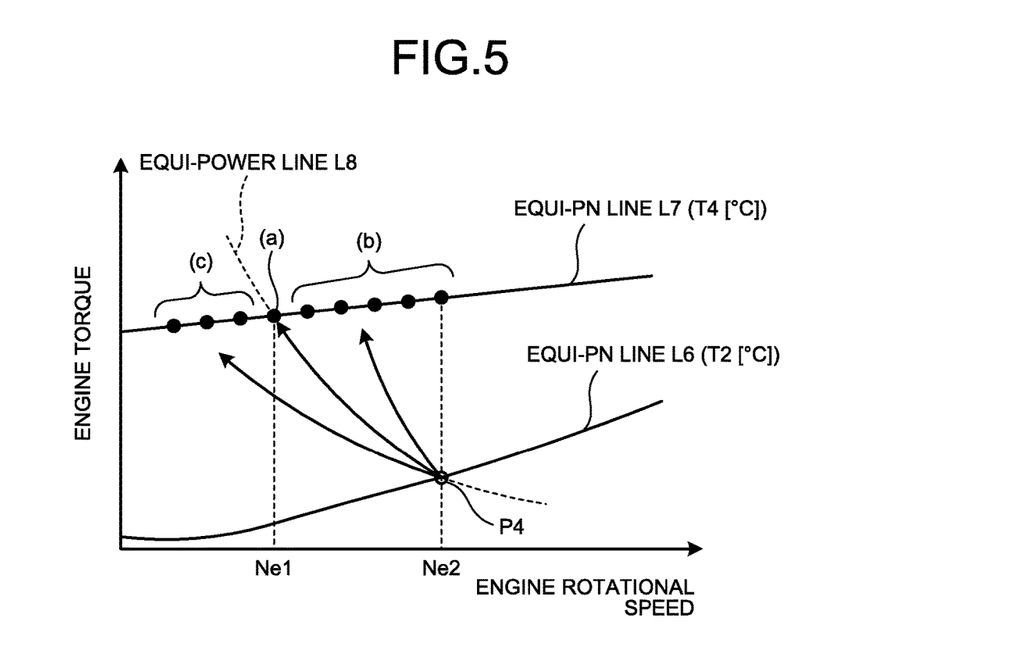
FIG. 5 illustrates an exemplary map for power generation that defines a relationship between the engine rotational speed and the engine torque with the water temperature of engine 2 at T2° C. and T4° C.

FIG. 5 illustrates an exemplary map for power generation that defines the relationship between the engine rotational speed and the engine torque with the water temperature of the engine 2 at T2° C. and T4° C. Note that the equi-PN line L6 at a water temperature of T2° C. and the equi-PN line L7 at a water temperature of T4° C. illustrated in FIG. 5 are identical in PN per unit gas quantity.

In the present embodiment, examples of a pattern of changing the operating point of the engine 2 with the water temperature of the engine 2 high due to the warm-up operation of the engine 2 include three patterns of retention in power generation quantity, increase in power generation quantity, and decrease in power generation quantity. Note that the operating point of the engine 2 requires to be changed stepwise or continuously as the water temperature of the engine 2 rises.

First, a case where the power generation quantity of the power generator 3 is kept constant with the water temperature of the engine 2 between at T2° C. and at T4° C., will be described (retention in power generation quantity).

In a case where the water temperature of the engine 2 rises from T2° C. to T4° C. along with the warm-up operation of the engine 2, the engine control device 20 moves, on the equi-power line L8, the operating point P4 of the engine 2 on the equi-PN line L6 at a water temperature of T2° C. onto the equi-PN line L7 at a water temperature of T4° C. This arrangement enables the engine 2 to operate at the operating point (a) of the engine 2 at which the engine output and the PN per unit gas quantity remain constant between at a water temperature of T2° C. and at a water temperature of T4° C. Therefore, the power generation quantity can be retained with the PN per unit gas quantity remaining constant between at a water temperature of T2° C. and at a water temperature of T4° C.

The operating point (a) of the engine 2 with the water temperature of the engine 2 at T4° C., has the engine rotational speed Ne1 (<Ne2) lower than the engine rotational speed Ne2 at the operating point P4 of the engine 2 at a water temperature of T2° C., so that lower NV can be achieved.

Next, a case where the power generation quantity of the power generator 3 is made higher with the water temperature of the engine 2 at T4° C. than with the water temperature of the engine 2 at T2° C., will be described (increase in power generation quantity).

In a case where the water temperature of the engine 2 rises from T2° C. to T4° C. along with the warm-up operation of the engine 2, the engine control device 20 moves, on the equi-PN line L7, the operating point of the engine 2 to any of a plurality of operating points (b) located in the range of from higher than the engine rotational speed Ne1 at the operating point (a) to the engine rotational speed Ne2. Because any operating point (b) is higher in engine torque and engine rotational speed than the operating point (a) located on the equi-PN line L7, the engine output increases, so that the power generation quantity of the power generator 3 increases. Therefore, increase in power generation quantity can be achieved at a water temperature of T4° C. to a water temperature of T2° C. with the PN per unit gas quantity identical to that at a water temperature of T2° C. Therefore, the charging time of the battery 5 can be shortened. Increase in power generation quantity with increase of the engine output enables shortening of the time required for warming up of the engine 2, because the engine rotational speed is higher at a water temperature of T4° C. than at a water temperature of T2° C., in comparison to a case where the power generation quantity remains constant between at a water temperature of T2° C. and at a water temperature of T4° C.

Next, a case where the power generation quantity of the power generator 3 is made lower with the water temperature of the engine 2 at T4° C. than with the water temperature of the engine 2 at T2° C., will be described (decrease in power generation quantity).

In a case where the water temperature of the engine 2 rises from T2° C. to T4° C. along with the warm-up operation of the engine 2, the engine control device 20 moves, on the equi-PN line L7, the operating point of the engine 2 to any of a plurality of operating points (c) located lower in engine rotational speed than the operating point (a). Because any operating point (c) is lower in engine torque and engine rotational speed than the operating point (a) located on the equi-PN line L7, the engine output decreases, so that the power generation quantity of the power generator 3 decreases. Therefore, decrease in power generation quantity can be achieved at a water temperature of T4° C. to a water temperature of T2° C. with the PN per unit gas quantity identical to that at a water temperature of T2° C. Decrease in power generation quantity with decrease of the engine output enables further lower NV, because the engine rotational speed is lower at a water temperature of T4° C. than at a water temperature of T2° C., than that in a case where the power generation quantity remains constant between at a water temperature of T2° C. and at a water temperature of T4° C.

Figure 6:
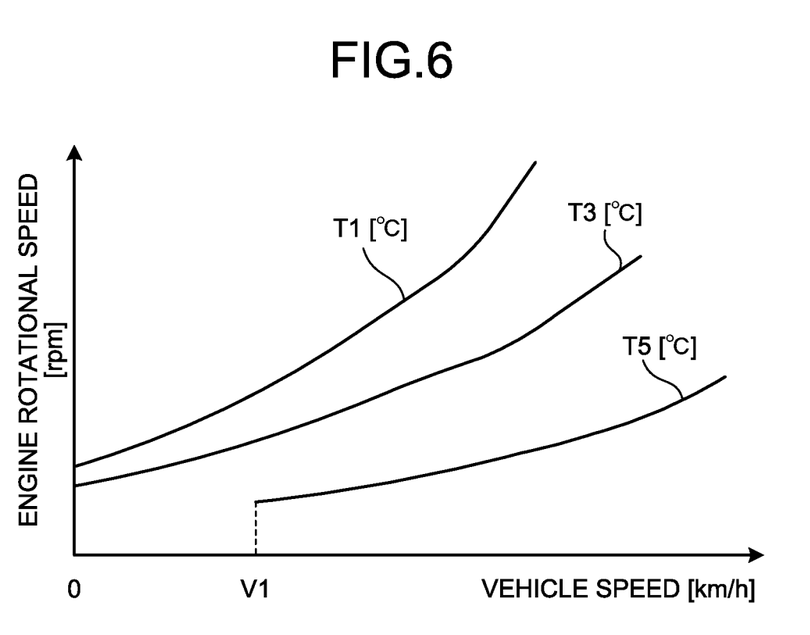
FIG. 6 illustrates an exemplary map for power generation that defines the relationship between vehicle speed and the engine rotational speed in a first engine intermittent operation mode.
Figure 7:
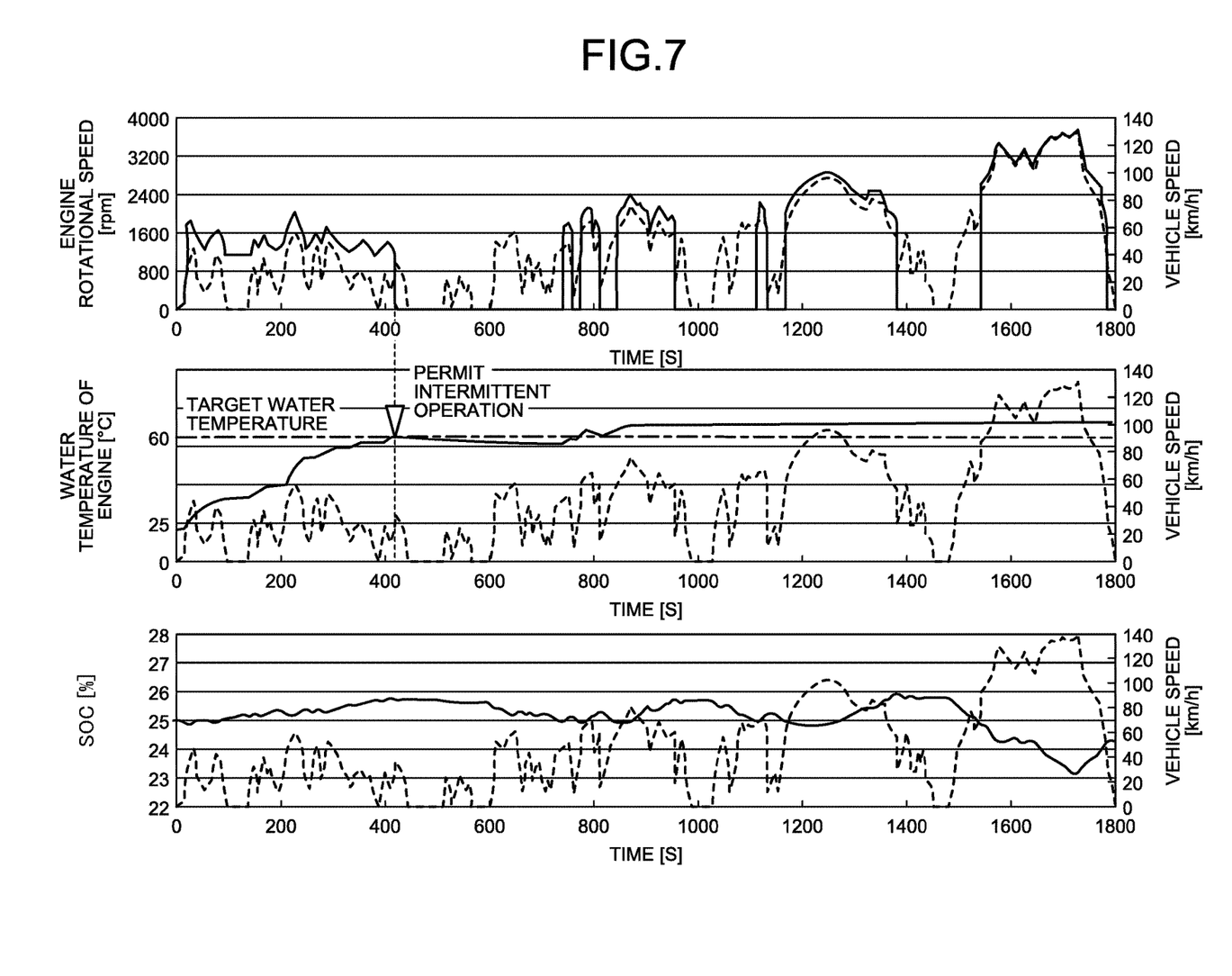
FIG. 7 is a time chart illustrating changes of the engine rotational speed, the water temperature of the engine 2, and the SOC of a battery 5 in the first engine intermittent operation mode.

FIG. 6 illustrates an exemplary map for power generation that defines the relationship between the vehicle speed and the engine rotational speed in a first engine intermittent operation mode. FIG. 7 is a time chart illustrating the changes of the engine rotational speed, the water temperature of the engine 2, and the SOC of the battery 5 in the first engine intermittent operation mode. Note that, in the upper graph of FIG. 7, the solid line indicates the engine rotational speed and the broken line indicates the vehicle speed. In addition, in the middle graph of FIG. 7, the solid line indicates the water temperature of the engine 2, the broken line indicates the vehicle speed, and the dot-and-dash line indicates the target water temperature. In addition, in the lower graph of FIG. 7, the solid line indicates the SOC of the battery 5 and the broken line indicates the vehicle speed.

Even in a case where the electric vehicle 1 according to the embodiment is in the CS mode in which the battery 5 can be charged by power generated by the power generator 3, if the SOC of the battery 5 is a predetermined value or more, the power generator 3 does not generate power, so that the battery 5 is not charged. That is the CS mode enables the intermittent operation of the engine 2 during which the engine 2 stops operating such that the power generator 3 does not generate power.

Meanwhile, in particular, when warming up of the engine 2 is not sufficient, in other words, when the water temperature of the engine 2 is low, the PN per unit gas quantity that occurs at the time of starting of the engine 2 is large. Thus, the electric vehicle 1 according to the embodiment has the first engine intermittent operation mode in which the intermittent operation of the engine 2 is prohibited when the water temperature of the engine 2 is lower than the target water temperature in the CS mode. In the first engine intermittent operation mode, for example, referring to FIG. 6, the intermittent operation of the engine 2 can be prohibited when the water temperature of the engine 2 is T1° C. or T3° C. and the intermittent operation of the engine 2 can be permitted when the water temperature of the engine 2 is T5° C. In a case where the intermittent operation of the engine 2 is permitted, for example, the engine 2 stops operating when the water temperature of the engine 2 is T5° C. and the vehicle speed is below a threshold of V1 km/h and the engine 2 operates when the water temperature of the engine 2 is T5° C. and the vehicle speed is a threshold of V1 km/h or more. Note that the relationship between the water temperature of the engine 2 and the threshold of the vehicle speed, for use as the criterion of determination of whether the engine 2 operates or stops operating in the intermittent operation of the engine 2, requires to be acquired, for example, by experiment in advance.

Here, as a result of the present inventors' hard repeated studies, for example, it has been found that the PN per unit gas quantity may be at a negligible level when the water temperature of the engine 2 is 60° C. (=T5° C.) or more. Thus, in the first engine intermittent operation mode, for example, as illustrated in FIG. 7, the target water temperature as the criterion of determination between prohibition and permission of the intermittent operation of the engine 2 is set at 60° C. The engine control device 20 prohibits the intermittent operation of the engine 2 when the water temperature of the engine 2 is below 60° C. and permits the intermittent operation of the engine 2 when the water temperature of the engine 2 is 60° C. or more.

Furthermore, in a case where the intermittent operation of the engine 2 is permitted, for example, the threshold of the vehicle speed as the criterion of determination of whether the engine 2 operates or stops operating is set at 40 km/h (=V1 km/h). The engine control device 20 causes the engine 2 to stop operating when the vehicle speed is below 40 km/h and causes the engine 2 to operate when the vehicle speed is 40 km/h or more. In this manner, the engine control device 20 restricts the engine rotational speed in accordance with the vehicle speed. When the vehicle speed is below 40 km/h, the engine 2 stops operating, so that lower NV can be achieved at the time of low vehicle speed at which any passenger is relatively annoyed with noise and vibration that occur along with the operation of the engine 2.

Therefore, with the electric vehicle 1 according to the embodiment in the first engine intermittent operation mode, the engine control device 20 restricts the engine rotational speed in accordance with the vehicle speed, so that both reduction of the PN per unit gas quantity and lower NV can be achieved.

Note that, when the vehicle speed is below 40 km/h, the engine control device 20 may perform control of lowering the engine rotational speed below than with the vehicle speed at 40 km/h or more, instead of causing the engine 2 to stop operating. This arrangement enables lower NV by the decrease of the engine rotational speed.

The engine control device 20 prohibits the intermittent operation of the engine 2 when the water temperature of the engine 2 is below 60° C. such that the engine 2 operates continuously during warming up of the engine 2, so that the time required for completion of warming up of the engine 2 can be shortened.

In the electric vehicle 1, as the vehicle speed increases, the output of the motor generator 6 required for driving the driving wheels 8 increases. Thus, in the electric vehicle 1 according to the embodiment, as illustrated in FIG. 6, increase of the engine rotational speed with increase of the vehicle speed causes the engine output to increase such that the power generation quantity of the power generator 3 increases. In this case, as the engine rotational speed increases, noise and vibration that occur along with the operation of the engine 2 increase. However, at the time of high vehicle speed, any passenger is not relatively annoyed with the noise and vibration, so that deterioration can be inhibited in NV.

Figure 8:
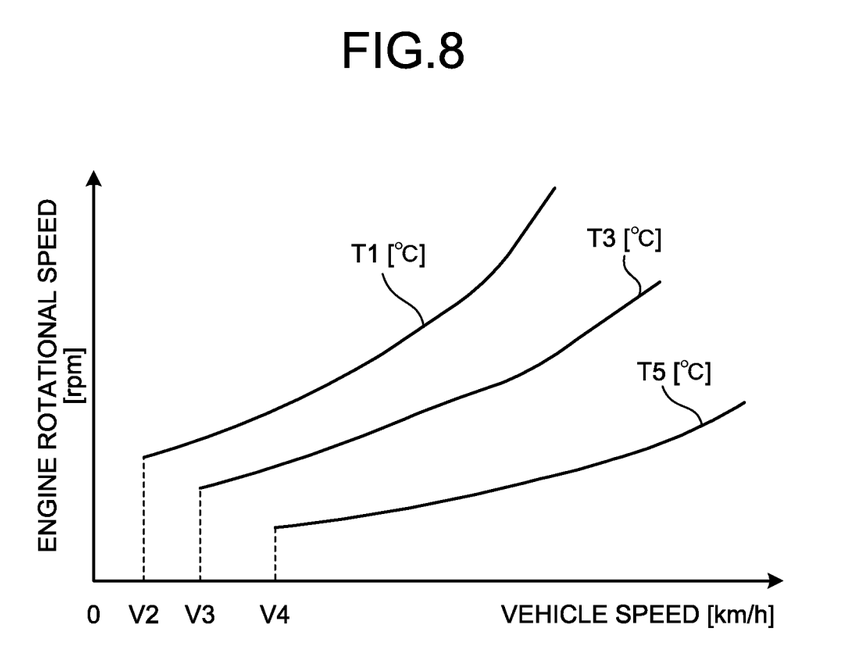
FIG. 8 illustrates an exemplary map for power generation that defines a relationship between the vehicle speed and the engine rotational speed in a second engine intermittent operation mode.
Figure 9:
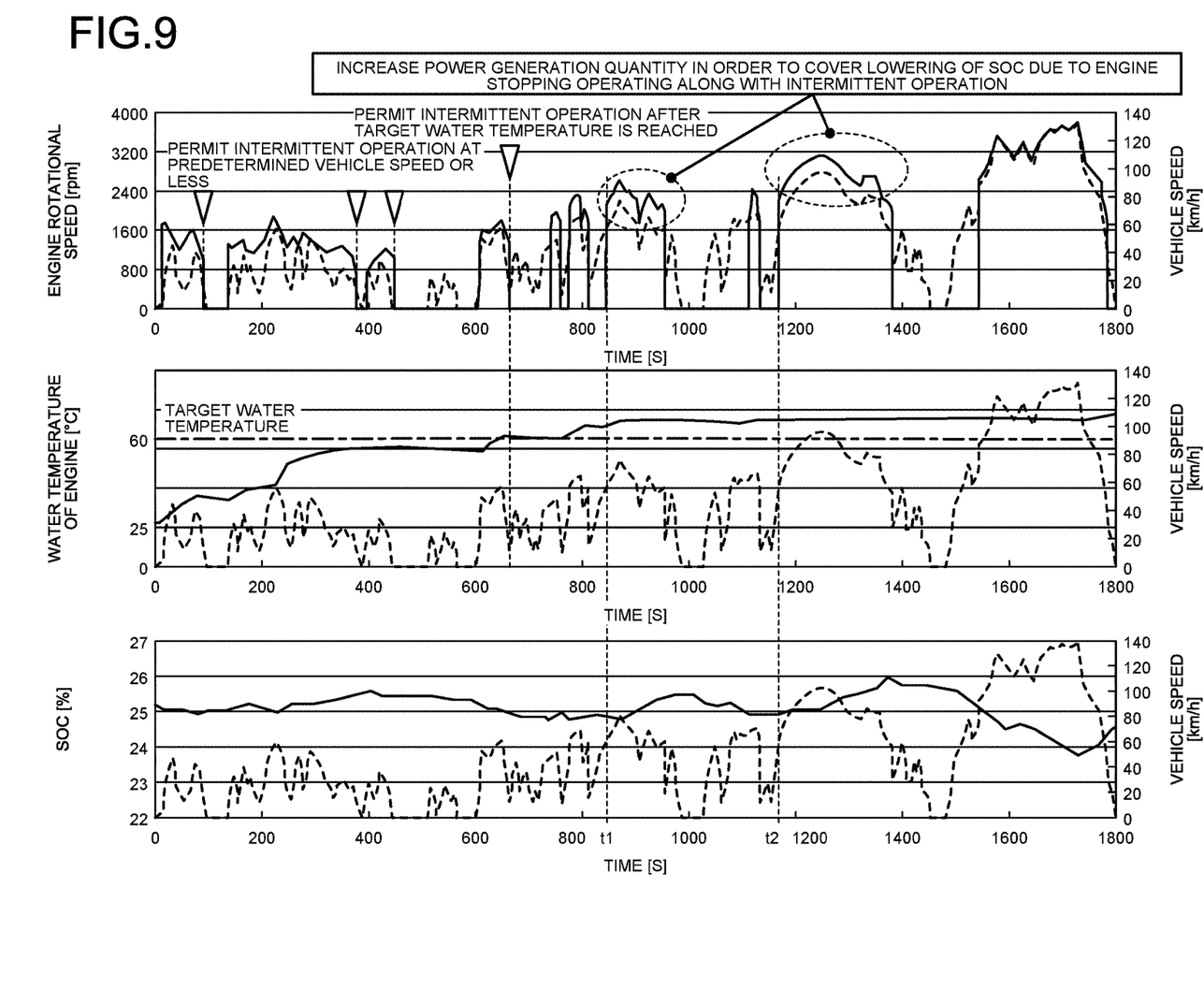
FIG. 9 is a time chart illustrating changes of the engine rotational speed, the water temperature of the engine 2, and the SOC of the battery 5 in the second engine intermittent operation mode.

FIG. 8 illustrates an exemplary map for power generation that defines the relationship between the vehicle speed and the engine rotational speed in a second engine intermittent operation mode. FIG. 9 is a time chart illustrating the changes of the engine rotational speed, the water temperature of the engine 2, and the SOC of the battery 5 in the second engine intermittent operation mode. Note that, in the upper graph of FIG. 9, the solid line indicates the engine rotational speed and the broken line indicates the vehicle speed. In addition, in the middle graph of FIG. 9, the solid line indicates the water temperature of the engine 2, the broken line indicates the vehicle speed, and the dot-and-dash line indicates the target water temperature. In addition, in the lower graph of FIG. 9, the solid line indicates the SOC of the battery 5 and the broken line indicates the vehicle speed.

In general, the electric vehicle 1 according to the embodiment travels while only the motor generator 6 is driving with the engine 2 stopping operating. Thus, there may be the demand that a passenger has no desire to sense noise and vibration that occur along with the operation of the engine 2. A passenger tends to be annoyed with noise and vibration that occur along with the operation of the engine 2, at low vehicle speed, in particular, while the electric vehicle 1 is stopping, for example, due to waiting for a traffic light. Thus, as illustrated in FIG. 8, the electric vehicle 1 according to the embodiment has the second engine intermittent operation mode in which the intermittent operation of the engine 2 is permitted regardless of the warm-up state of the engine 2, in other words, the water temperature of the engine 2.

In the second engine intermittent operation mode, for example, referring to FIG. 8, the engine 2 stops operating when the water temperature of the engine 2 is T1° C. and the vehicle speed is below a threshold of V2 km/h and the engine 2 operates when the water temperature of the engine 2 is T1° C. and the vehicle speed is a threshold of V2 km/h or more. The engine 2 stops operating when the water temperature of the engine 2 is T3° C. and the vehicle speed is below a threshold of V3 km/h and the engine 2 operates when the water temperature of the engine 2 is T3° C. and the vehicle speed is a threshold of V3 km/h or more. The engine 2 stops operating when the water temperature of the engine 2 is T5° C. and the vehicle speed is below a threshold of V4 km/h and the engine 2 operates when the water temperature of the engine 2 is T5° C. and the vehicle speed is a threshold of V4 km/h or more. This arrangement enables, regardless of the water temperature of the engine 2, lower NV at the time of low vehicle speed at which any passenger is relatively annoyed with noise and vibration that occur along with the operation of the engine 2.

Therefore, with the electric vehicle 1 according to the embodiment in the second engine intermittent operation mode, the engine control device 20 restricts the engine rotational speed in accordance with the vehicle speed, so that both reduction of the PN per unit gas quantity and lower NV can be achieved.

In the second engine intermittent operation mode, as illustrated in FIG. 9, in the intermittent operation of the engine 2 after the water temperature of the engine 2 reaches the target water temperature (60° C.), the engine 2 operates so as to cover lowering of the SOC of the battery 5 due to the engine 2 stopping operating along with the intermittent operation. For example, after the water temperature of the engine 2 reaches the target water temperature (60° C.), the engine control device 20 increases the engine rotational speed for increase of the engine output at predetermined timings t1 and t2 at which the SOC of the battery 5 falls below 25%, so that the power generation quantity of the power generator 3 increases.

In the electric vehicle 1 according to the embodiment, for example, any passenger operates an in-vehicle mode-switching switch (not illustrated) and then the engine control device 20 performs, on the basis of a signal from the mode-switching switch, switching between the first engine intermittent operation mode and the second engine intermittent operation mode. Note that the switching between the first engine intermittent operation mode and the second engine intermittent operation mode is not limited to an operation of any passenger to the mode-switching switch. For example, any passenger may utter vocabulary enabling discrimination between the first engine intermittent operation mode and the second engine intermittent operation mode, to a sound collector in an in-vehicle voice recognition device, and then the engine control device 20 may perform switching between the first engine intermittent operation mode and the second engine intermittent operation mode, on the basis of a signal corresponding to the vocabulary from the voice discrimination device. Alternatively, an in-vehicle camera may capture the driver, and an image recognition device may specify the driver on the basis of the captured image. Then, the engine control device 20 may perform mode switching so as to select an engine intermittent operation mode that is previously registered to the specified driver and is either the first engine intermittent operation mode or the second engine intermittent operation mode.

Figure 10:
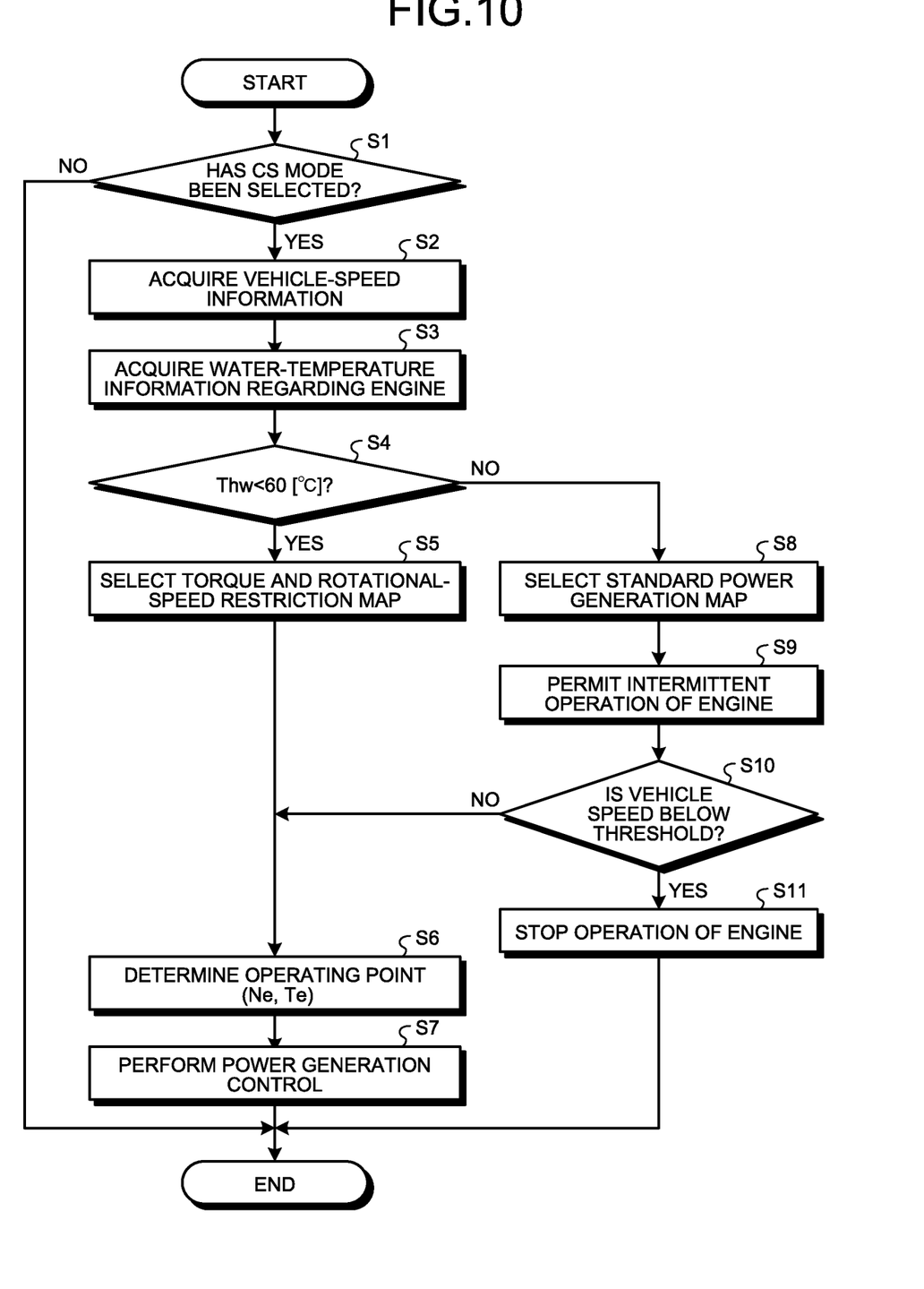
FIG. 10 is a flowchart of exemplary control of selecting a map for power generation in accordance with the warm-up state of the engine.

FIG. 10 is a flowchart of exemplary control of selecting a map for power generation in accordance with the warm-up state of the engine 2.

First, the engine control device 20 determines whether the CS mode has been selected (Step S1). In a case where the CS mode has not been selected (No in Step S1), the engine control device 20 finishes a flow of control. Meanwhile, in a case where the CS mode has been selected (Yes in Step S1), the engine control device 20 acquires vehicle-speed information from the vehicle-speed sensor (Step S2). Next, the engine control device 20 acquires water-temperature information regarding the engine 2 from the water-temperature sensor 10 (Step S3). Next, the engine control device 20 determines whether the water temperature Thw of the engine 2 detected by the water-temperature sensor 10 is below 60° C. that is the target water temperature (Step S4).

In a case where it is determined that the water temperature Thw of the engine 2 is below 60° C. (Yes in Step S4), the engine control device 20 selects a torque and rotational-speed restriction map in which the engine torque and the engine rotational speed are set in restraint, as the map for power generation (Step S5). Next, with the torque and rotational-speed restriction map, the engine control device 20 determines the operating point (Ne, Te) on the target equi-PN line corresponding to the water temperature of the engine 2 (Step S6). Note that the above "Ne" represents the engine rotational speed, and the above "Te" represents the engine torque.

Next, the engine control device 20 performs power generation control in which the engine 2 operates continuously on the basis of the operating point (Ne, Te) determined in Step S6 such that the power generator 3 generates power (Step S7). Then, a flow of control finishes.

In a case where it is determined in Step S4 that the water temperature Thw of the engine 2 is not below 60° C. (No in Step S4), the engine control device 20 selects a standard power generation map in which only the engine rotational speed is set in limitation, as the map for power generation (Step S8). Next, the engine control device 20 permits the intermittent operation of the engine 2 (Step S9). Next, the engine control device 20 determines whether the vehicle speed is below the threshold (Step S10). In a case where it is determined that the vehicle speed is below the threshold (Yes in Step S10), the engine control device 20 causes the engine 2 to stop operating (Step S11). Then, a flow of control finishes.

Meanwhile, in a case where it is determined that the vehicle speed is not below the threshold (No in Step S10), the engine control device 20 proceeds to Step S6.

Figure 11:
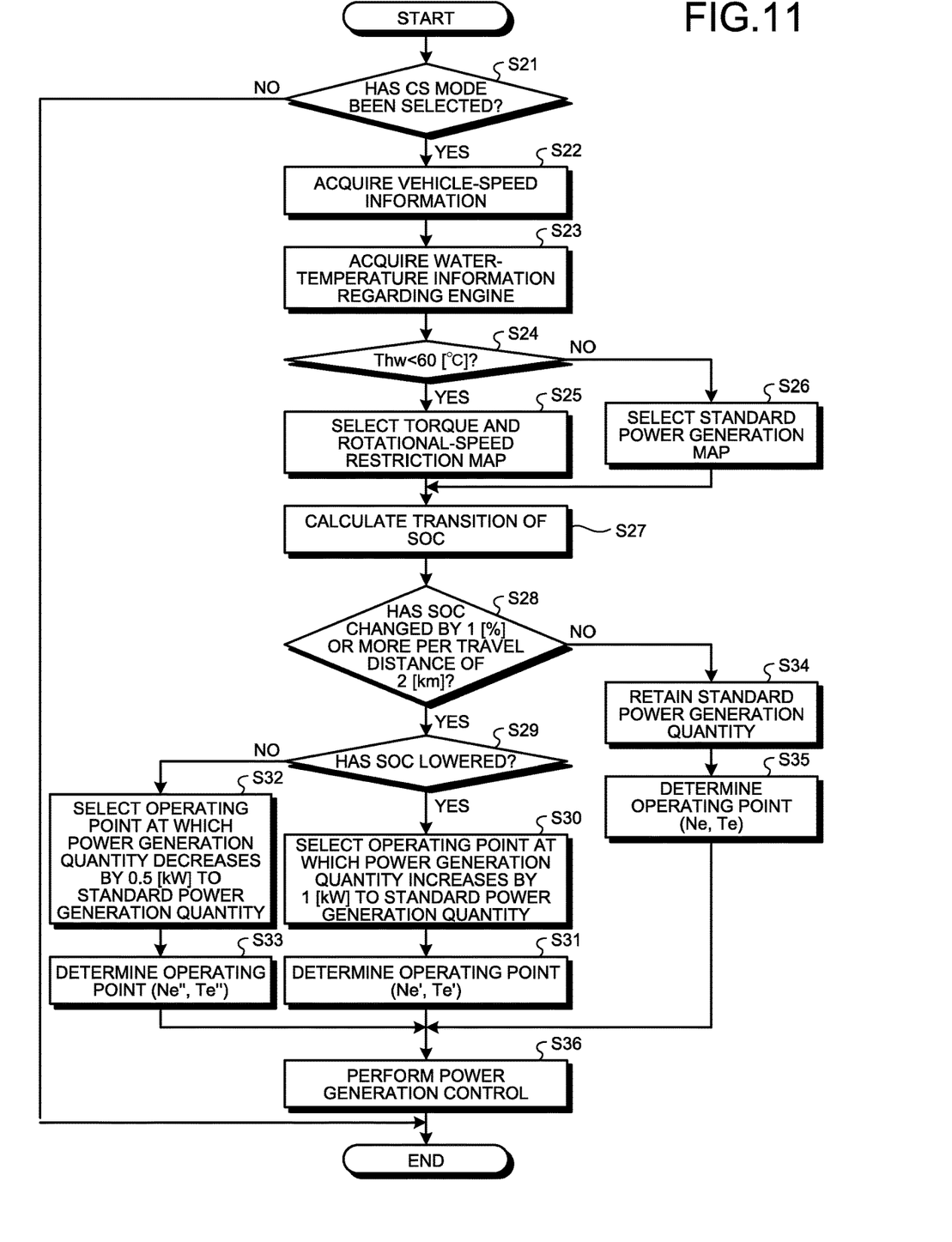
FIG. 11 is a flowchart of exemplary control of selecting a map for power generation in accordance with the warm-up state of the engine and changing the operating point of the engine along with the change of the SOC of the battery.

FIG. 11 is a flowchart of exemplary control of selecting a map for power generation in accordance with the warm-up state of the engine 2 and changing the operating point of the engine 2 along with the change of the SOC of the battery 5.

First, the engine control device 20 determines whether the CS mode has been selected (Step S21). In a case where the CS mode has not been selected (No in Step S21), the engine control device 20 finishes a flow of control. Meanwhile, in a case where the CS mode has been selected (Yes in Step S21), the engine control device 20 acquires vehicle-speed information from the vehicle-speed sensor (Step S22). Next, the engine control device 20 acquires water-temperature information regarding the engine 2 from the water-temperature sensor 10 (Step S23). Next, the engine control device 20 determines whether the water temperature Thw of the engine 2 detected by the water-temperature sensor 10 is below 60° C. that is the target water temperature (Step S24).

In a case where it is determined that the water temperature Thw of the engine 2 is below 60° C. (Yes in Step S24), the engine control device 20 selects a torque and rotational-speed restriction map as the map for power generation (Step S25). Meanwhile, in a case where it is determined that the water temperature Thw of the engine 2 is not below 60° C. (No in Step S24), the engine control device 20 selects a standard power generation map as the map for power generation (Step S26).

Next, after the selection of the torque and rotational-speed restriction map in Step S25 or after the selection of the standard power generation map in Step S26, the engine control device 20 calculates the transition of the SOC of the battery 5 (Step S27). Next, the engine control device 20 determines whether the SOC of the battery 5 has changed by 1% or more per travel distance of 2 km (Step S28).

In a case where it is determined that the SOC of the battery 5 has changed by 1% or more per travel distance of 2 km (Yes in Step S28), the engine control device 20 determines whether the SOC of the battery 5 has lowered (Step S29).

In a case where it is determined that the SOC of the battery 5 has lowered (Yes in Step S29), the engine control device 20 selects the operating point of the engine 2 at which the power generation quantity of the power generator 3 increases by 1 kW to a standard power generation quantity (Step S30). Then, the engine control device 20 determines the operating point (Ne', Te') corresponding to the water temperature of the engine 2 such that the power generation quantity increases by 1 kW to the standard power generation quantity (Step S31). Next, the engine control device 20 performs power generation control in which the engine 2 operates on the basis of the determined operating point (Ne', Te') such that the power generator 3 generates power (Step S36). Then, a flow of control finishes.

Meanwhile, in a case where it is determined in Step S29 that the SOC of the battery 5 has not lowered (No in Step S29), the engine control device 20 selects an operating point at which the power generation quantity of the power generator 3 decreases by 0.5 kW to the standard power generation quantity (Step S32). Then, the engine control device 20 determines the operating point (Ne", Te") corresponding to the water temperature of the engine 2 such that the power generation quantity decreases by 0.5 kW to the standard power generation quantity (Step S33). Next, the engine control device 20 performs power generation control in which the engine 2 operates on the basis of the determined operating point (Ne", Te") such that the power generator 3 generates power (Step S36). Then, a flow of control finishes.

In a case where it is determined in Step S28 that the SOC of the battery 5 has not changed by 1% or more per travel distance of 2 km (No in Step S28), the engine control device 20 retains the standard power generation quantity (Step S34). Note that the standard power generation quantity is, for example, 5 kW to 7 kW. Then, the engine control device 20 determines the operating point (Ne, Te) corresponding to the water temperature of the engine 2 such that the standard power generation quantity is retained (Step S35). Next, the engine control device 20 performs power generation control in which the engine 2 operates on the basis of the determined operating point (Ne, Te) such that the power generator 3 generates power (Step S36). Then, a flow of control finishes.

The engine control device for the electric vehicle according to the present disclosure enables effective achievement of both reduction of the particulate number of particulate matter and lower NV.

According to an embodiment, it is possible to lower NV in the intermittent operation of the engine with reduction of the particulate number of particulate matter per unit gas quantity.

According to an embodiment, it is possible to lower NV with the engine stopping operating at the time of low vehicle speed.

According to an embodiment, it is possible to make easy determination of the engine rotational speed and the engine torque corresponding to the warm-up state of the engine.

According to an embodiment, it is possible to make easy determination of the warm-up state of the engine.

EFFECT OF THE INVENTION

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An engine control device for an electric vehicle, the electric vehicle including: an electrical rotating machine generating a driving force for driving a wheel; a power storage device storing a power to be supplied to the electrical rotating machine; a power generator generating power to charge the power storage device; and an engine generating a driving force for driving the power generator, the engine control device comprising:
   an engine control unit configured to:
      determine an engine rotational speed and an engine torque such that a particulate number of particulate matter per unit gas quantity that the engine releases into an atmosphere becomes equal to or less than a target value having been set in association with a warm-up state of the engine, the engine rotational speed, and the engine torque, and such that when a vehicle speed is less than a threshold value, the engine rotational speed is lower than the engine rotational speed when the vehicle speed is equal to or more than the threshold value;
      control the engine based on the determined engine rotational speed and the engine torque; and
      permit an intermittent operation of the engine when the engine is warmer than the engine in a predetermined warm-up state, wherein
      in a case where the engine control unit permits the intermittent operation of the engine, the engine control unit is further configured to cause the engine to stop operating when the vehicle speed is below the threshold value, and cause the engine to operate when the vehicle speed is equal to or more than the threshold value.

2. The engine control device for the electric vehicle according to claim 1, wherein the engine control unit determines the engine rotational speed and the engine torque based on a map indicating a relationship between the engine rotational speed and the engine torque corresponding to the target value, the map being created for each warm-up state of the engine.

3. The engine control device for the electric vehicle according to claim 1, wherein the engine control unit determines the warm-up state of the engine based on a temperature of a coolant for cooling the engine, a temperature of engine oil, an engine integrated air quantity, engine total operation hours, or a vehicle travel distance in engine operation.

* * * * *